Feb. 4, 1930.　　　　A. J. JANSSON　　　　1,746,217
PIVOT JOINT
Filed May 23, 1927　　　4 Sheets-Sheet 3

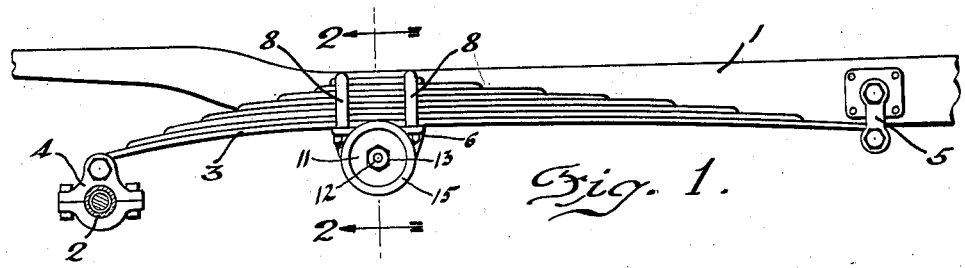
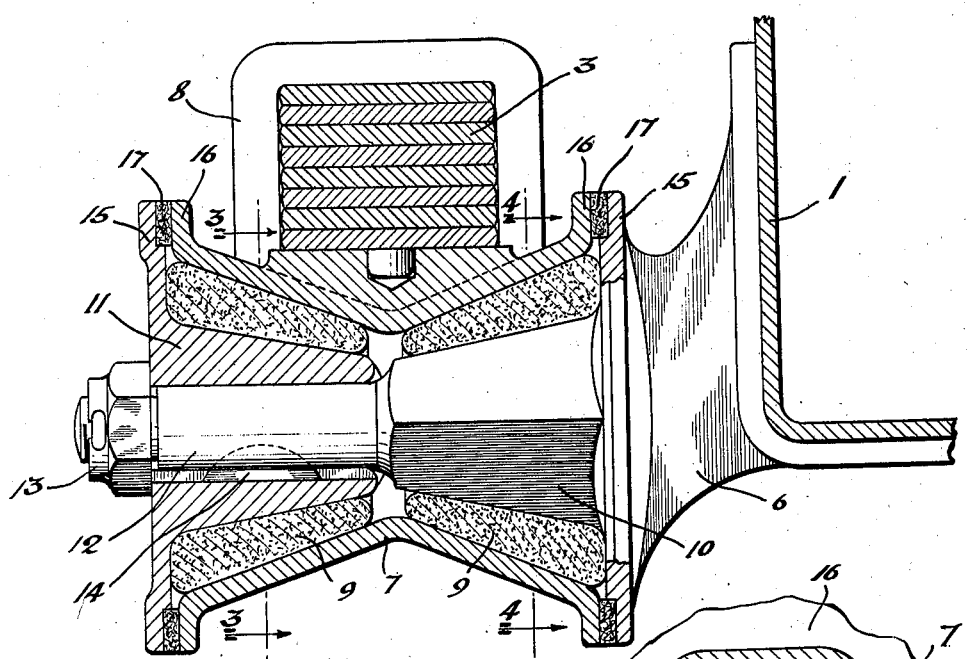
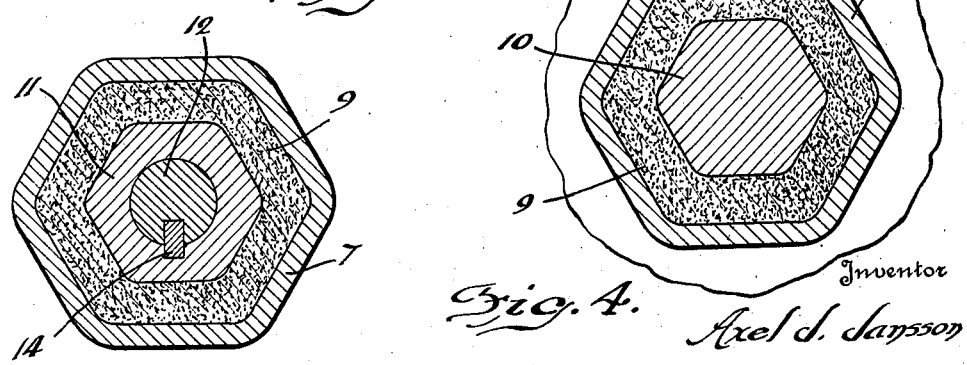

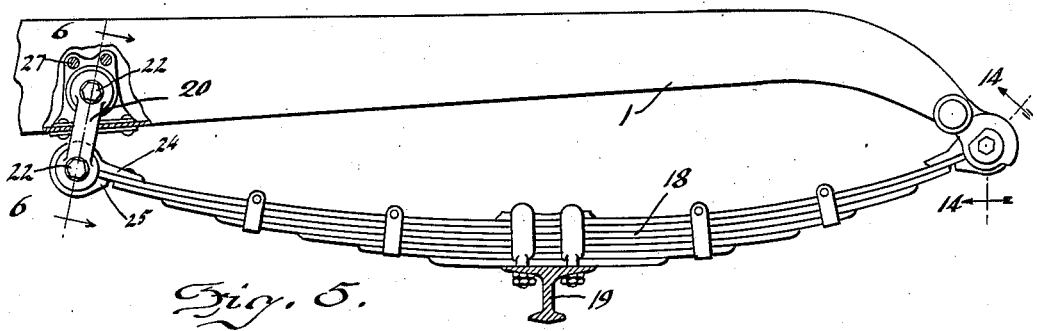
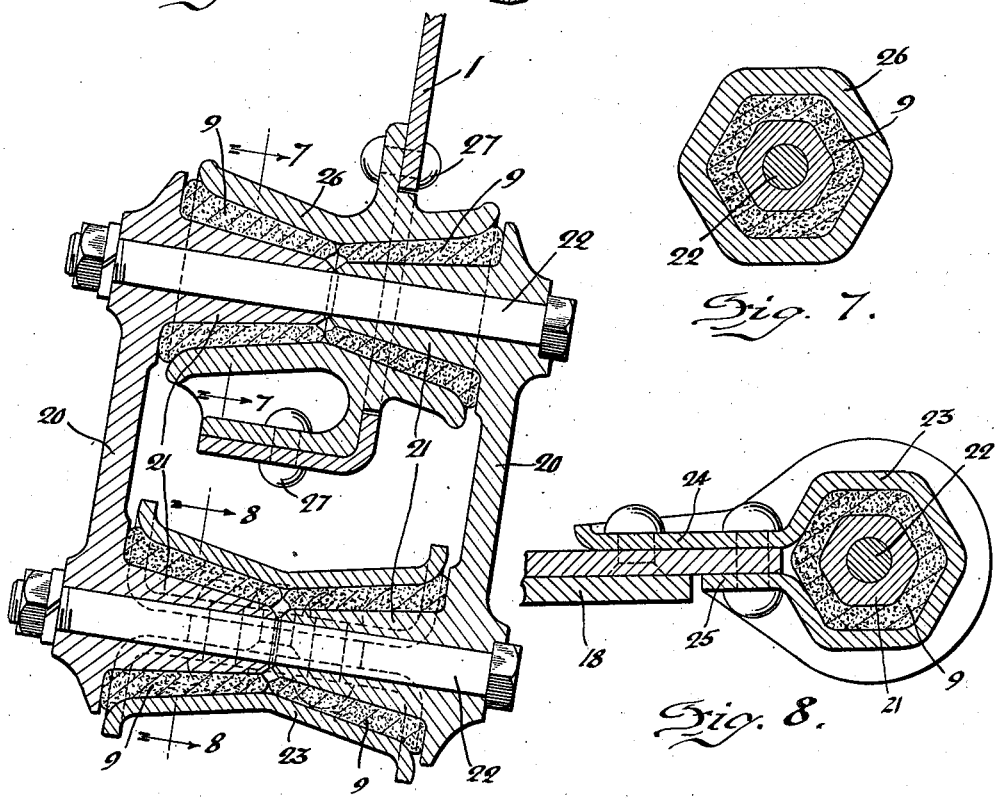

Inventor
Axel J. Jansson
By Blackmore, Spencer & Hieb
Attorneys

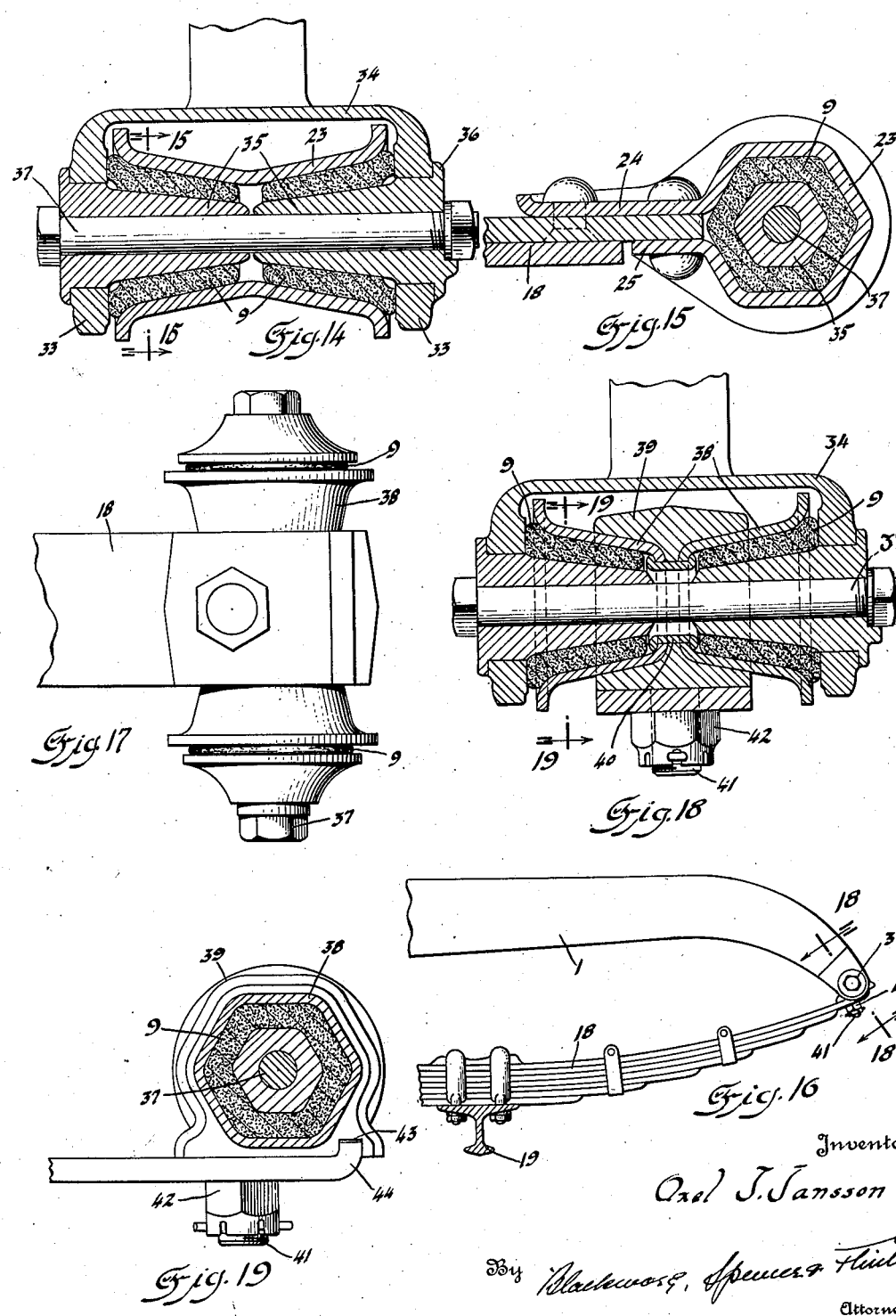

Patented Feb. 4, 1930

1,746,217

UNITED STATES PATENT OFFICE

AXEL J. JANSSON, OF FLINT, MICHIGAN, ASSIGNOR TO GENERAL MOTORS CORPORATION, OF DETROIT, MICHIGAN, A CORPORATION OF DELAWARE

PIVOT JOINT

Application filed May 23, 1927. Serial No. 193,569.

This invention relates to new and useful improvements in pivotal joints and has particular utility as a hinge connection for a load supporting vehicle spring.

The object of the invention is to provide an improved spring mounting of rubber, or other non-metallic resilient substance, which permits relative movement of the parts by its deformation between adjacent surfaces of the parts, thereby obviating frictional metallic contact and the consequent wear and breakage, and eliminating the usual problems of lubrication.

A further object of the invention is to provide an elastic mounting, which while capable of ready response to relative pivotal or rotational motion, will be resistant to relative axial movement and thus free the parts of objectionable side sway.

Figure 9:
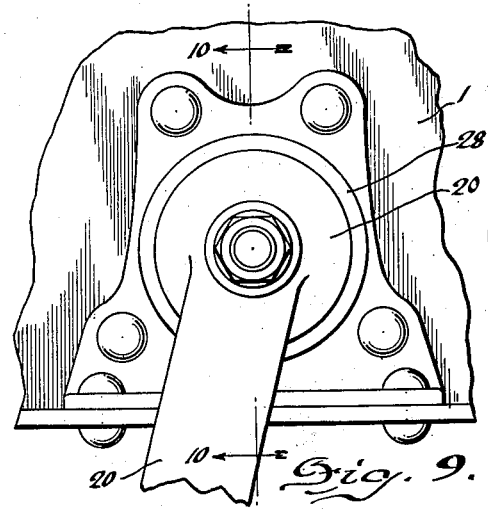
Figure 10:
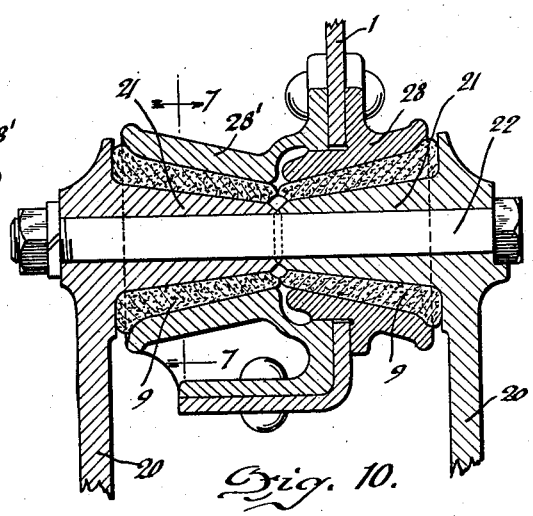
Figure 11:
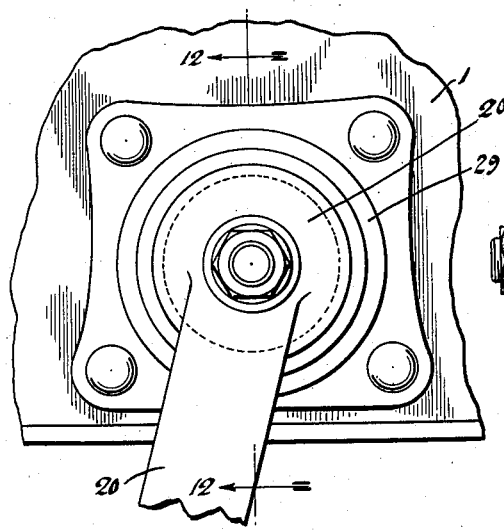
Figure 12:
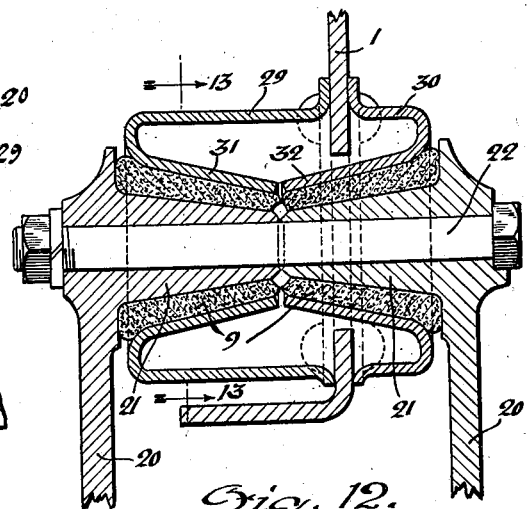
Figure 13:
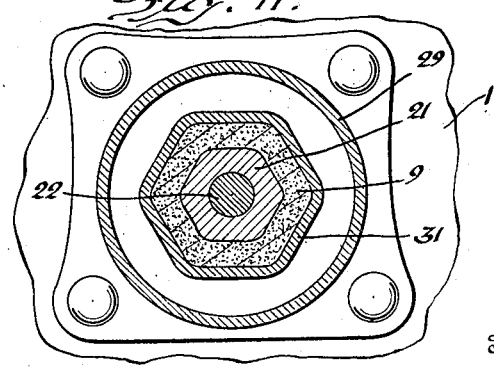

Other objects and advantages will be apparent from the following specification taken in connection with the accompanying drawing illustrating the invention embodied in various associations, and wherein, Figure 1 is a side elevation of a rear portion of a vehicle frame, with a load supporting spring of the cantilever type mounted thereon; Figure 2 is a vertical sectional view through the hinge joint and is taken on line 2—2 of Figure 1; Figures 3 and 4 are transverse sections 3—3 and 4—4 respectively of Figure 2; Figure 5 is an elevation of a portion of a chassis frame mounted on a semi-elliptical spring; Figure 6 is a section on line 6—6 of Figure 5; Figure 7 is a section on line 7—7 of Figure 6; Figure 8 is a section on line 8—8 of Figure 6; Figure 9 is a side elevation of a portion of the link shown in Figure 10; Figure 10 is a section on line 10—10 of Figure 9 and shows an alternative detail of the Figure 6 swinging shackle construction; Figure 11 is an end elevation of a further detail modification; Figure 12 is a section on line 12—12 of Figure 11; Figure 13 is a section on line 13—13 of Figure 12; Figure 14 is a section on line 14—14 of Figure 5; Figure 15 is a section on line 15—15 of Figure 14; Figure 16 is an elevation of a modified form of connection; Figure 17 is a bottom plan view of the joint shown in Figure 16; Figure 18 is a section on line 18—18 of Figure 16; Figure 19 is a section on line 19—19 of Figure 18.

Referring to the drawings wherein similar parts are represented by like reference characters, the numeral 1 indicates a longitudinally extending side sill or member of the chassis frame of a motor vehicle. In Figure 1 the chassis frame member is supported on the rear axle 2 by means of a cantilever type multi-leaf spring 3. Following customary practice, one end of the spring 3 is shown pivoted to a collar 4 on the axle 2, and a swinging shackle link 5 connects the other end of the spring with the chassis frame member 1, while a pivotal joint is provided between an intermediate portion of the spring and the chassis frame member to permit slight rotational movement upon spring deflection. In this case the pivot joint consists of a hanger bracket 6, riveted or otherwise secured to the chassis frame member 1, and which has a laterally projecting member or leg, which forms a trunnion for a concentrically arranged tubular member or sleeve 7, secured to the spring 3, as by U-clamps 8. Both the trunnion and the tubular member 7 are polygonal in cross section, the adjacent surfaces being shown in the drawing of hexagonal outline, and they are further axially divergent, or angularly inclined outward from the center. Elastic bushings or pads 9 of rubber or other similar material are interposed in the space between adjacent flat surfaces of the trunnion and member 7, and are deformable therebetween upon relative rotation of the members. The angularly inclined faces provide an annular trough-like or V-shaped peripheral surface for the trunnion and since the adjacent surfaces of the tubular member are of similar inclination, the tendency for the parts will be to remain in a definite axial relation, obviating objectionable side sway.

To facilitate assembly of the joint the hexagonal trunnion member is formed of two frusto-pyramidal sections 10 and 11, the section 10 being an integral part of the bracket 6, and from which extends the shank portion 12, while the section 11 is detachably secured by a nut 13 on the shank 12, and is held against rotation by a key or spline 14. At the base of each section 10 and 11, is an annular flange 15, the two flanges extending into proximity with annular flanges 16 at opposite ends of the member 7, and serving to maintain the tubular member 7 therebetween. Packing rings 17 of fibre, graphite or the like, may be inserted between the flanges 15 and 16 to reduce friction upon relative movement.

In Figure 5 a semi-elliptical spring 18 is interposed between the front axle 19 and the chassis frame member 1 and pivot joints of the same general type as heretofore described, connect opposite ends of the spring to the frame. At one end, the connection is by means of a swinging shackle to accommodate extension of the spring upon deflection. The shackle comprises two link members 20—20, each having lateral projections or bosses 21 at the top and bottom, which are inwardly tapered and polygonal in cross section. Corresponding bosses on the two link members extend toward each other, and long bolts 22 pass thru alined apertures in the bosses, connecting the links one to another. These bosses form inner members of the pivot joints on the end of the spring and frame sill. The outer member of the joint for the end of the spring consists of a sleeve 23, which corresponds in polygonal cross sectional contour with the inner member and is inclined in opposite directions diverging outwardly from the center, inclosing the elastic bushings 9 between the inner and outer members. This sleeve 23 is preferably formed from sheet metal and the opposite ends are extended laterally to provide attachment ears 24 and 25, which are riveted to the top and bottom surfaces of the long leaf of the spring 18. The upper set of bosses on the links are located within an axial opening in the bracket 26, secured by rivets 27 on the frame sill 1, the opening tapering inwardly from opposite ends and also being polygonal in cross section. As in the preceding instances, the elastic bushings 9 between the parts, permit relative movement by deformation.

In lieu of the bracket 26 formed in one piece, the outer member of the joint may comprise separate portions 28 and 28', riveted on opposite sides of the longitudinal sill 1, as is shown particularly in Figure 10. In this case, each portion affords one-half of the bearing surface for the outer member, the two surfaces flaring outwardly from each other. As a further alternative, the outer member may be of sheet material in two cylindrical sections 29—30, secured respectively on opposite sides of the frame member 1, and having inner frusto-pyramidal portions 31—32, which afford the bearing surfaces of the outer member. Figures 11, 12 and 13 illustrate this alternative arrangement.

The end of the spring opposite to the swinging shackle connection, is also provided with a sleeve member 23, which is located between dependent arms 33—33 of a forked bracket 34, carried on the end of a downturned horn of the chassis frame sill 1. Each fork or arm 33 has an aperture or opening and a frusto-pyramidal lug 35 extends thru the opening and within the outer member 23, the two lugs 35 forming the inner member of the joint. Annular flanges 36 bear against the face of the arms 33 and a bolt 37 passing thru the lugs connect the lugs to each other and to the bracket 35.

The remaining figures of the drawing illustrate a modified form of outer joint member, wherein the elastic bushings 9 are located within a pair of cups 38—38, which are surrounded by an annular collar 39 and held against separation by a ring 40, having its ends out-turned into interlocking engagement with inturned flanges at the inner ends of the cups. A dependent screw threaded stem or stud 41 on the collar 39, extends thru an opening in the long leaf of the spring and the castellated nut 42 thereon, secures the outer member of the joint to the end of the vehicle spring. The bottom of the collar 39 is also provided with a groove or channel 43 and an upturned ear 44 at the extremity of the spring leaf extends into this groove to obviate tendency of the spring end turning about the stem 41.

Having described my invention I claim:

1. A pivot joint including a pair of concentrically arranged relatively movable members, the adjacent surfaces of which are correspondingly tapered in an axial direction and of polygonal contour in cross section, and non-metallic resilient material interposed betweeen said adjacent surfaces.

2. A pivot joint including a pair of relatively movable members arranged in concentric spaced relation, the adjacent surfaces thereof being respectively of polygonal contour in cross section and axially divergent, and non-metallic elastic material filling the space between said members.

3. A pivot joint for connecting relatively movable parts including an outer member having a polygonal opening therethru which tapers inwardly from opposite sides of the member, an inner member extending within said opening, said inner member being of polygonal cross section and tapered inwardly in substantial agreement with the interior of said outer member, and a bushing of deformable material interposed between adjacent surfaces of said members.

4. A pivot joint for connecting relatively movable parts including an outer member having a polygonal opening extending therethru which is of varying diameter, an inner member within said opening, of polygonal cross section and of varying diameter substantially in accordance with that said opening and a deformable bushing interposed between said members to accommodate relative movement thereof.

5. A pivot joint including a pair of relatively movable members arranged in concentric spaced relation, the adjacent surfaces of which are each angularly inclined in an axial direction, the apices of respective angles being located medially of the joint and elastic material filling the space between said members for deformation upon relative movement thereof.

6. A pivot joint including a trunnion member having a V-shaped peripheral surface extending axially of the joint and a rotatable sleeve member mounted thereon and having a V-shaped interior surface agreeing substantially in contour with said V-shaped peripheral surface of the trunnion and elastic material interposed between said members for deformation upon relative movement thereof.

7. A pivot joint including a bracket for attachment with a vehicle frame, and having a laterally projecting member consisting of an axially inclined polygonal portion and a shank portion, an axially inclined polygonal sleeve portion removably carried on said shank portion, a relatively movable member for attachment with a vehicle spring, surrounding said laterally projecting member, and having an interior contour corresponding with said axially inclined polygonal portions, and elastic non-metallic material interposed between said members for deformation upon relative movement thereof.

8. A pivot joint including a pair of relatively movable members arranged in concentric spaced relation, the outer member consisting of a tubular portion of polygonal shape in cross section, with oppositely flared ends, the inner member consisting of a pair of frusto-pyramidal portions extending into the flared ends and detachably engageable with each other, and elastic bushings interposed between said members, said bushings being held by said polygonal surfaces against bodily movement with either member, the relative movement of said members being permitted by the inherent elasticity of the bushings.

9. A pivot joint including a pair of relatively movable members concentrically arranged one about the other, the adjacent surfaces thereof being spaced apart and angularly inclined axially to resist axial movement of the members, annular flanges on the inner member extending into proximity with the ends of the outer member and co-operating therewith to further resist axial movement, and elastic material filling the intermediate space between adjacent surfaces of the members and deformable therebetween to permit relative rotational movement of said members.

In testimony whereof I affix my signature.

AXEL J. JANSSON.